United States Patent Office 2,788,375
Patented Apr. 9, 1957

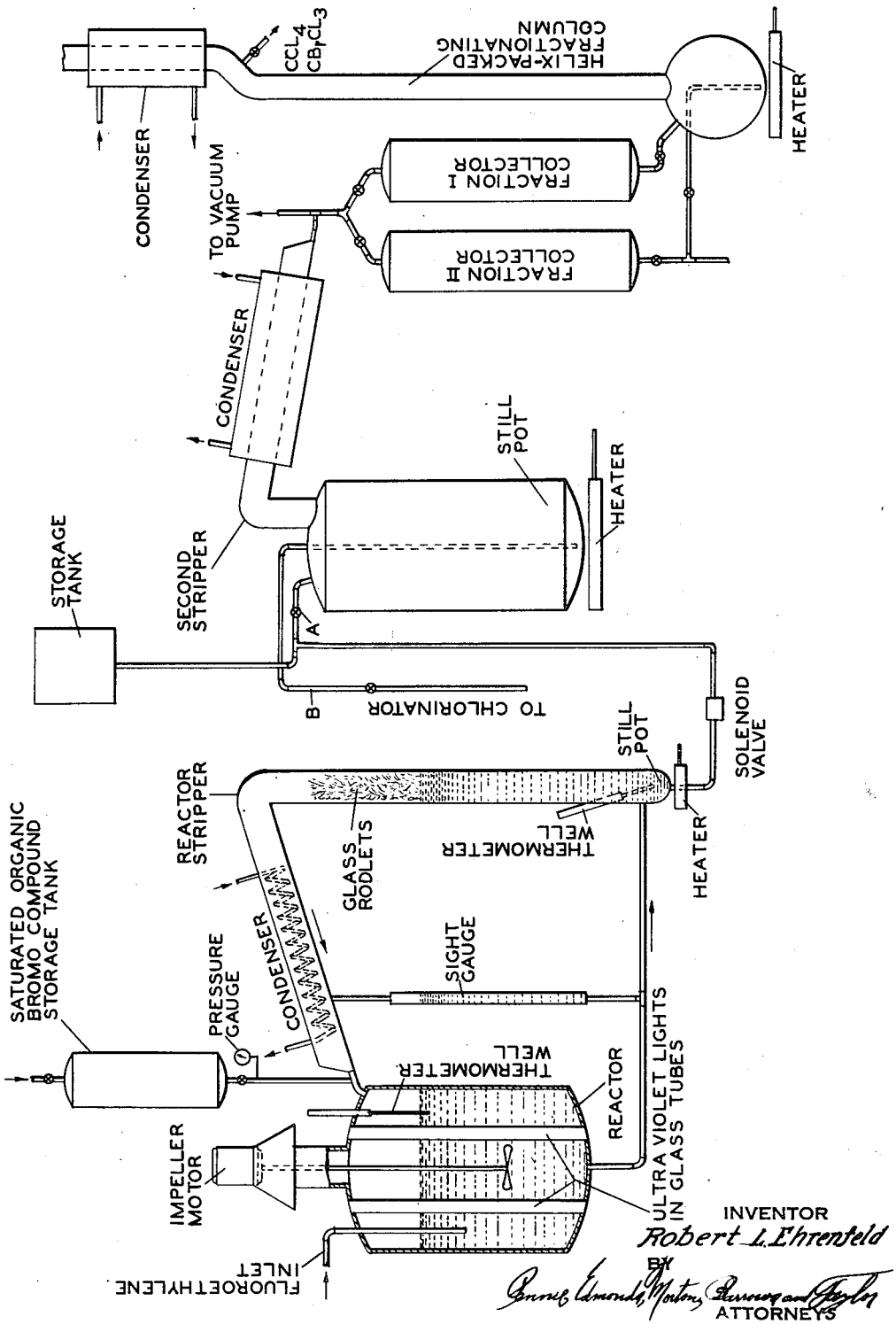

2,788,375

OXYGEN FREE HALOPOLYFLUORO COMPOUNDS AND METHOD OF PRODUCING SAME

Robert L. Ehrenfeld, New York, N. Y.

Application March 13, 1951, Serial No. 215,256

13 Claims. (Cl. 260—653)

This invention relates to the preparation of fluorinated organic compounds, and has for its object the provision of saturated halopolyfluoro compounds, such as bromopolyfluoro and chloropolyfluoro compounds, and a method of producing such compounds. More particularly, the new chemical compounds are saturated halopolyfluoro compounds containing one or more polyfluoroethylene groups per molecule.

Heretofore it has been the practice to use peroxy compounds such as benzoyl peroxide or sodium persulfate as catalysts in the production of polymeric fluorinated organic compounds. The resulting products, especially those containing low molecular weight compounds, give off acid products on standing and treatments with powerful fluorinating agents have been resorted to to overcome this difficulty. Such treatments involve many steps, expensive reagents, and do not yield a uniform product. Further, the use of peroxy compounds makes it difficult to operate a continuous process and also limits the process temperature to ranges in which the decomposition rate of the peroxy compound is appropriate.

The invention provides a method for the preparation of saturated organic halopolyfluoro compounds and compositions of matter consisting of such saturated compounds. In one of its advantageous aspects the invention provides a continuous method for the production of saturated halopolyfluoro compounds in an efficient operation. The compounds of the invention have exceptional thermal and chemical stability.

In accordance with the method of my invention, I react a fluoroethylene containing at least two fluorine atoms, both on the same carbon atom, with a saturated organic bromo compound in the presence of actinic rays of such wavelength as to cause decomposition of the bromo compound. This decomposition reaction produces saturated bromopolyfluoro compounds containing at least one fluoroethylene unit per molecule of bromo compound reactant. The resulting bromopolyfluoro product can then be treated with a suitable halogen such as chlorine in the presence of actinic light to readily yield the corresponding chloropolyfluoro compound and bromine.

In an advantageous embodiment, the invention may be carried out by reacting chlorotrifluoroethylene with a saturated bromo compound in the presence of actinic light in a de-oxygenated system. Saturated bromopolychlorotrifluoro compounds are obtained containing one or more chlorotrifluoroethylene units per molecule of bromo compound. These resulting products may be represented by the general formula $Br(CF_2CFCl)_nR$ where $n$ is an integer in the range from 1 to about 30 and R is the complement portion of the bromo reactant. The bromopolychloro compounds may be converted to chloropolyfluoro compounds by treatment with chlorine in the presence of actinic light in a de-oxygenated system.

The fluoroethylenes suitable for use in my invention may be represented by the general formula $CF_2=CX_2$ where X may be hydrogen, chlorine, or fluorine.

Saturated organic bromo compounds suitable for this reaction contain at least one C-Br linkage. These saturated organic bromo compounds may be halogenated bromomethanes, ethanes, propanes, etc., containing one or more bromines on one or more carbon atoms and may be represented as R-Br where R is a saturated hydrocarbon radical containing from one to thirty carbon atoms which may contain bromine, chlorine, or fluorine.

The saturated halopolyfluoro compounds prepared in accordance with this invention may be designated by the general formula $R(CF_2CX_2)_nY$ where R is a saturated hydrocarbon radical which may contain bromine, chlorine, or fluorine, X is hydrogen, chlorine, or fluorine, $n$ is an integer from one to about thirty and Y is a halogen of the group consisting of chlorine, bromine, and fluorine.

In these products the carbon of the polyfluoroethylene unit is directly connected through a carbon atom or a chain of carbon atoms to the bromide link. In the preferred products $n$ is a positive integer in the range 1 to 15.

It is also possible to obtain products in which all of the fluoroethylene units are not necessarily connected together and which may be represented by the general formula $Q((CF_2CX_2)_n)_xY_x$ where Q is a saturated organic radical, $x$ represents a valence of one or more, $n$ is a plural integer not greater than 30 and Y is a halogen of the group consisting of chlorine, bromine, and fluorine. Such compounds are formed by reacting a compound represented by $QBr_x$ with $(CF_2=CX_2)$ under the influence of actinic rays. It is to be understood that the units in parenthesis correspond to the particular fluoroethylene which is employed in the reaction, although chlorotrifluoroethylene is the preferred reactant. The sum total of the atoms other than the fluoroethylene units is equivalent to only one molecule of the original alkyl bromide. Thus the saturated alkyl bromide compounds in this invention react with a fluoro olefin such as chlorotrifluoroethylene to yield a series of saturated bromopolychlorotrifluoro compounds which on treatment with a desired halogen form the corresponding halopolychlorotrifluoro compounds.

The following specific example is given to further illustrate the invention:

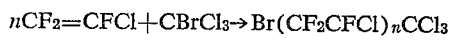

On treatment with chlorine the following reaction occurs:

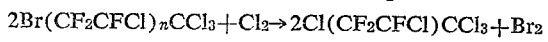

The chlorinated product may be fluorinated with such common fluorinating agents as cobalt trifluoride, chlorine, trifluoride, manganese tetrafluoride, silver difluoride, hydrogen fluoride in conjunction with antimony catalysts, etc., to yield more highly fluorinated products as

, etc.

Another specific example may be given to illustrate the application of the invention to 1,1 dibromo compounds.

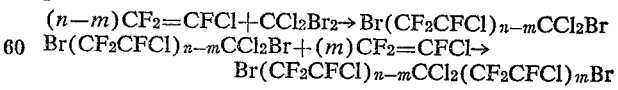

The letter $n$ refers to a plural integer not greater than 30 and the letter $m$ is not greater than $n$ and is an integer in the range from 0 to 30. The bromo products may be chlorinated with chlorine to yield

Corresponding reactions will occur with more highly brominated bromo compounds. Thus the most general formula representing the new bromo compounds is

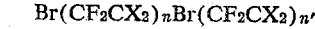

where X is hydrogen, chlorine, or fluorine; $n$ is a plural integer not greater than 30; $n'$, $m$, and $m'$ are integers from 0 to 30; and Q is the complement portion of a saturated bromo compound containing from 1 to 30 carbon atoms.

The method for carrying out the reaction varies to some extent with different types of organic bromo compounds but the usual procedure consists in charging a given amount of organic bromo compound into a reaction vessel, closing the vessel, evacuating the dead gas from the system and charging a sufficient amount of olefin, such as chlorotrifluoroethylene, to maintain the desired pressure at the operating temperature and employing vigorous agitation. The agitation maintains a constant olefin concentration in the liquid phase while the mixture is irradiated with actinic rays. Reaction liquid is continuously removed from the reaction vessel and fed into a heated vessel to vaporize the entire feed except the bromopolyfluoro products. Advantageously, the heated vessel may include a still pot in which the vapors are flashed, leaving the bromopolyfluoro product. The vaporized material is condensed and forced back into the reaction vessel. Additional bromo compound is added to maintain a constant reaction liquid volume. In this manner, the reaction may be carried out continuously (except for a short initial build-up period) at constant reactant conditions. The bromopolyfluoro compounds, tapped from the still pot, are preferably transferred to a second reaction vessel, similar to the first described vessel, and treated with chlorine while stirred, and irradiated with actinic light.

The temperature at which the reaction is effected may be varied over a wide range depending on the nature of the reactants and the molecular weight of the product desired. However, the temperature should be below that at which decomposition or pyrolysis of either the reactants or product occurs. The reaction temperature is usually maintained at $-20°$ or higher in order to obtain a substantial reaction in a reasonable time. The preferred temperature range is 15° to 200° but lower or higher temperatures are sometimes desirable.

A series of products are usually obtained which vary from liquids to solids depending upon the organic bromo compound and the member of polyfluoroethylene units per molecule. The liquid products range in viscosity from light to very viscous oils and the solids vary from greases to high melting resins. The liquid products are usually compatible with the common organic solvents whereas the solid products show a progressively lower solubility as their melting points increase.

The invention is further illustrated by the following examples in which the parts are by weight.

EXAMPLE I

*Batch operation*

A 2 liter Pyrex glass flask was approximately half filled with bromotrichloromethane and evacuated to remove oxygen. Chlorotrifluoroethylene was charged in under pressure to give approximately 2.1 lbs. p. s. i. at 36°. The mixture of liquid and gas was irradiated with a mercury arc lamp and stirred vigorously; additional chlorotrifluoroethylene being slowly added to maintain a constant pressure. When about three percent of the bromotrichloromethane had reacted, the reaction was stopped and products distilled. There was obtained 9.8 parts by weight of liquid B. P. range 145°/760 mm.– 152°/78 mm., 10.8 parts by weight of medium viscosity oil B. P. 107°–156°/1 mm., and 1.2 parts by weight of viscous oil residue. The first fraction was redistilled and yielded mainly a pure compound $C_3F_3Cl_4Br$ boiling from 100°–110°/70 mm.

TABLE 1

|  | Percent Br | Percent Cl |
|---|---|---|
| Fraction B. P. range, 100°–110°/70 mm | 25.3 | 44.8 |
| Calculated for $C_3F_3Cl_4Br$ | 25.4 | 45.1 |
| Fraction B. P. range, 50°–107°/1 mm | 14.7 | 44.6 |
| Calculated for $CCl_3(C_2F_3Cl)_2Br$ | 18.5 | 41.2 |

The two fractions listed in Table 1 were treated at reflux temperature and atmospheric pressure with chlorine in glass vessels illuminated by incandescent lamps until no further bromine was given off.

TABLE 2

| Fraction Chlorinated | Percent Cl | $CCl_3(C_2F_3Cl)_n$ Cl | Theor. |
|---|---|---|---|
| B. P. Range, 100°–110°/70 mm | 68.0 | $n=1$ | 65.8 |
| B. P. Range, 50°–107°/1 mm | 55.1 | $n=2$ | 54.2 |

EXAMPLE 2

Using the same operation as in Example 1

$$CCl_3CF_2CFClBr$$

(1-bromo 1,2,2 trifluoro 1,3,3,3 tetrachloropropane) was reacted with chlorotrifluoroethylene at 50° and 17.2 p. s. i. for 7½ hours. The polymer products were insoluble in the reaction mixture and precipitated out in the form of a fine suspension. Removal of the unreacted bromopropane by vacuum distillation left a solid residue with a melting point of about 110°

Repeating the above experiment at 150° and 16.4 p. s. i. for three hours gave, after removal of unreacted bromopropane, 7.6 parts B. P. range 80°–102°/1 mm., 8.0 parts B. P. range 102°–183°/1 mm. and 4.9 parts of a residue which was a soft grease at 20°.

|  | Percent Br | Percent Cl |
|---|---|---|
| Analysis of fraction having a B. P. range of 102°–183°/1 mm | 13.4 | 38.5 |
| Calculated for—$CCl_3(C_2F_3Cl)(C_2F_3Cl)_2Br$ | 14.6 | 38.8 |

EXAMPLE 3

Using the same operation as in Example 1

$$CF_2BrCCl_2Br$$

(1,2 dibromo 1,1 dichloro 2,2 difluoroethane) was reacted with chlorotrifluoroethylene at 49° and 3.9 p. s. i. for 10 hours. After removal of the bromoethane by distillation the following fractions were obtained by distillation under reduced pressure: in the B. P. range 75°–90°/65 mm. 7.7 parts, B. P. range 100°–200°/1 mm. 8.4 parts, residue (melting point 30°) 5.1 parts.

|  | Percent Br | Percent Cl |
|---|---|---|
| Analysis of fraction having a B. P. range, 100°–200°/1 mm | 26.2 | 27.5 |
| Calculated for—$C_2F_2Cl_2Br(C_2F_3Cl)_3Br$ | 23.5 | 31.4 |

EXAMPLE 4

Using the same operation as in Example 1, $$CF_2BrCFClBr$$

(1,2 dibromo 1 chloro 1,2,2 trifluoro ethane) was reacted with chlorotrifluoroethylene at 69° and 7.5 p. s. i. for 3½ hours. Under these conditions the product was insoluble in the reaction mixture and precipitated out in the form of a fine suspension. After removal of the bromo ethane, there remained a resin with a melting point of 124°

On repetition of this experiment at 115° and 11.9 p. .s. i. for 6 hours followed by removal of the unreacted bromoethane, the following fractions were obtained: in the B. P. range 75°–145°/65 mm. 4.3 parts, B. P. range 80°–200°/1 mm. 6.1 parts, residue 4.9 parts.

|  | Percent Br | Percent Cl |
|---|---|---|
| Analysis of fraction having a B. P. range, 80°–200°/1 mm. | 22.4 | 25.3 |
| Calculated for—$C_2ClF_3Br(C_2ClF_3)_4Br$ | 21.6 | 23.9 |

EXAMPLE 5

Using the same operation as in Example 1, chlorotrifluoroethylene was reacted with a mixture of 19.4 parts of carbon tetrachloride and 32.5 parts of $CBr_2Cl_2$ (dibromodichloromethane) at 3.9 p. s. i. and 35° for 14½ hours. On fractional distillation of the low boiling reactants, there was obtained 17.9 parts of carbon tetrachloride, 2.4 parts of a fraction in the B. P. range 80°–132°/760 mm. and 25.3 parts of dibromodichloromethane. Vacuum distillation of the polymer products gave 3.7 parts in the B. P. range 155°/760 mm.–147°/65 mm., 2.1 parts in the B. P. range 80°–141/1 mm., and 0.6 part of a residue with the consistency of a heavy oil.

EXAMPLE 6

By reducing the concentration of organic bromide and lowering the temperature of reaction, it was possible to obtain a high polymer by the action of actinic light.

Liquid chlorotrifluoroethylene containing approximately 0.03% bromotrichloromethane was irradiated with a mercury arc at 7°. Polymer product precipitated out slowly as a white powder during the irradiation and after 12 hours 5% of the monomer had polymerized. This product when pressed between two aluminum foil lined hot plates at 250° and quenched formed a clear flexible sheet.

When sym-dibromotetrafluoroethane was substituted for bromotrichloromethane in the above procedure, the same observations were made.

EXAMPLE 7

The continuous operation of the method of the invention will be described in connection with the apparatus diagrammatically illustrated in the accompanying drawing.

Liquid bromotrichloromethane is passed into a 9 gal. stainless steel reactor until half filled and the entire reactor system is evacuated and purged with chlorotrifluoroethylene to eliminate dead gas, namely, nitrogen and oxygen. Chlorotrifluoroethylene is rapidly passed in until an equilibrium pressure of 60 p. s. i. is reached and the liquid temperature is kept at 45° C. while stirring the mixture. During the process of dissolving the olefin, the liquid level in the reactor will rise to about ¾ capacity and since the heat of solution of the olefin in the bromomethane is appreciable, some cooling may be necessary. When the pressure and temperature are properly adjusted to the above-mentioned values, the ultra-violet lights are turned on and the heater under the reactor stripper is also turned on. Reaction liquid distilling out of the reactor stripper back into the reactor sets up a liquid flow removing reaction liquid from reactor into the reactor stripper. As polymeric product is collected in the reactor stripper still pot, its temperature rises and the solenoid valve which is activated by a thermostat in the thermometer well of the reactor stripper slowly passes the product out into a second stripper so as to maintain a temperature of 170–190° C in the reactor stripper. To replace the product removed from the reactor stripper through the solenoid valve, bromomethane is added to the reactor from a storage tank (under 100 p. s. i. nitrogen pressure) and chlorotrifluoroethylene is passed into the reaction liquid to maintain 60 p. s. i. in the reactor. When the still pot of the second stripper is about ¾ filled, the product stream is temporarily diverted to a storage tank by closing valve A, and the accumulated products in the second stripper are separated into two distillate fractions and a residue. This is done by collecting Fraction I in the temperature range of 20° to 110° at 30 mm., Fraction II in the temperature range at 110° to 125° at a pressure varying from 30 mm. to 0.5 mm. The stripper is then pressured to about 15 p. s. i. with nitrogen and the non-boiling residue in the still pot of the second stripper is forced upward through pipe B and sent to a chlorinator. Fraction I is further distilled through a helix-packed column to yield carbon tetrachloride (small amounts) and bromotrichloromethane. The carbon tetrachloride is discarded and the bromotrichloromethane is returned to bromotrichloromethane supply tank.

During a 48-hour period in which the ultra-violet lights were on continuously and the stirrer and stripper system operated for two fourteen-hour periods with the rate of circulation of liquid through the reactor stripper at approximately 2 gallons per hour. The product mixture was removed continuously from the reactor stripper still pot so as to keep the temperature at 170°–190° C. A total of 39.5 parts of chlorotrifluoroethylene and 36.5 parts of bromotrichloromethane were added during the 48-hour period to replace the product removed. The product mixture was separated by rough distillation into the following fractions and a residue, as above described:

| Fraction No. | B. P. Range | Weight, parts |
|---|---|---|
| I | 20°/30 mm.–110°/30 mm. | 31.0 |
| II | 110°/30 mm.–125°/0.5 mm. | 9.2 |
| Residue (a) | Above 125° C./0.5 mm. | 34.7 |

Fraction I was redistilled through a helix packed column at atmospheric pressure to yield the following fractions and a residue:

| Fraction No. | B. P. Range | Weight, parts | Percent | Main Prod. |
|---|---|---|---|---|
| III | 75–100°/750 mm. | 2.5 | 12.2 | $CCl_4$ |
| IV | 100–106°/750 mm. | 11.2 | 54.9 | $CBrCl_3$ |
| Residue (b) | Above 106°/750 mm. | 6.7 | 32.9 | $C_3BrCl_4F_3$ |

Fraction II and/or residue (b) may be diverted to batch reactor in which it is further polymerized with additional chlorotrifluoroethylene to yield higher polymerization products.

Carbon tetrachloride in small amounts was observed in the product and arose from the reaction

$$2CBrCl_3 \rightarrow CCl_4 + CBr_2Cl_2$$

which occurred in the reactor stripper still pot catalyzed by the layer of metal salts on the walls of the pot.

Table 3 shows the results obtained by varying the conditions of operation of the process of Example 7. The variations include the introduction of carbon tetrachloride as a component of the reactor mixture and by varying the pressures and temperatures as shown in the Table 3.

TABLE 3

| Run | Parts, CBrCl₃ | CCl₄ | Pres., p. s. i. | Temp., °C. | Percent of Yield by Weight | | Res. | Mt. Pt. Res., degrees |
|---|---|---|---|---|---|---|---|---|
| | | | | | 145°/760-100°/1 mm. | 100°-200°/1 mm. | | |
| 1 | 2.62 | 22.0 | 17.8 | 35 | 16.3 | 4.9 | 78.8 | 123 |
| 2 | 14.5 | 11.9 | 18.4 | 35 | 53.3 | 31.5 | 15.1 | 58 |
| 3 | 14.8 | 11.9 | 13.4 | 27 | 44.5 | 37.1 | 18.4 | 67 |

The effect of increasing the ratio of chlorotrifluoroethylene to bromotrichloromethane is shown to increase the molecular weight of the product. The results of Example 1 may be compared with runs 1 and 2 in Table 3 to show a progressive shift in average molecular weight of product from light oils to resins as the ratio of monomer to bromo compound is increased by the addition of inert solvent at a given temperature and monomer concentration. An alternate way to increase the olefin-bromo compound ratio would be, of course, to raise the operating pressure of the reaction by monomer addition.

The effect of a decrease in temperature is shown by a comparison of runs 2 and 3 to also increase the molecular weight of the product. In order to maintain a given monomer-bromo compound ratio, the lower temperature reaction was carried out at a corresponding lower pressure.

By the action of chlorine in the light of a tungsten filament lamp, the bromine in any of the polymer products was readily replaced by chlorine. The reaction was carried out by bubbling chlorine gas through the polymer fraction at a temperature of from 150° to 250° and was completed when no further bromine was evolved. Table 4 lists the analyses of two representative fractions before and after chlorination.

TABLE 4

| Fraction Treated | Before Cl | | After Cl, Percent Cl |
|---|---|---|---|
| | Percent Br | Percent Cl | |
| B. P. range, 100°-200°/1 mm. | 10.9 | 38.6 | 43.5 |
| Residue Run 1 | 7.1 | 31.9 | 32.0 |

Herein I have described polyfluoroethylene as the olefin constituent of the reaction but it is to be understood that I may use other fluoro-olefines having up to 10 carbon atoms. I may also substitute both iodine or chlorine as the halogen in the initiating and chain transferring molecule. Moreover, as shown in Example 7, the upper limit of carbon may be increased to upwards of one thousand to produce high molecular weight plastics with the same superior chemical and heat resistant properties as shown by the low molecular weight materials more fully described herein.

When replacing the bromine with chlorine in the long chain polyfluorobromides using chlorine gas and light, it is often desirable to replace the last traces of bromine with chlorine using a more active agent such as chlorine trifluoride in order to save time.

It is also understood that mixtures of suitable olefines and/or light sensitive compounds may be used in the carrying out of this process and the preparation of the aforementioned compounds.

The temperatures given herein are in ° C., and p. s. i. represent gauge pressure.

I claim:

1. The method of producing an oxygen-free mixture of saturated bromopolyfluoro compounds represented by the formula $Br(CF_2CFCl)_nCCl_3$ which comprises reacting $CF_2=CFCl$ and $CBrCl_3$ in a reaction vessel under pressure with agitation and under the influence of actinic rays as result from a mercury arc lamp.

2. The method of producing an oxygen-free mixture of compounds having the formula $Cl(CF_2CFCl)_nCCl_3$ which comprises reacting $Br(CF_2CFCl)_nCCl_3$ with chlorine to displace the bromine where $n$ is a plural integer.

3. The method of producing an oxygen-free mixture of saturated bromopolyfluoro compounds which comprises reacting together in a reaction vessel a halogenated, saturated, aliphatic hydrocarbon containing at least one bromine atom and chlorotrifluoroethylene by heating a mixture of the reacting compounds with accompanying agitation and under the influence of actinic rays as result from a mercury arc lamp, passing the reaction product of the mixture to another vessel, and subsequently heating the reaction product of the mixture to distill therefrom chlorotrifluoroethylene, the bromo organic compound, and some polymeric product, thus effecting a stripping of the more volatile portion thereof which is returned to the reaction vessel, and recovering in the other vessel a polymeric product which comprises the bromopolyfluoro compounds.

4. The method of producing an oxygen-free-mixture of bromopolyfluoro compounds which comprises continuously introducing into a reaction vessel a halogenated, saturated, aliphatic hydrocarbon containing at least one bromine atom of the series methanes, ethanes, propanes, etc., continuously passing into the reaction vessel chlorotrifluoroethylene, agitating the resulting mixture while under the influence of heat and actinic rays as result from a mercury arc lamp, removing from the reaction vessel to another vessel a liquid mixture containing a polymeric product together with chlorotrifluoroethylene, heating said liquid to flash off a volatile portion comprising chlorotrifluoroethylene and some polymeric product which is condensed and returned to the reaction vessel, and recovering from the heated liquid a polymeric product which is a mixture of bromopolyfluoro compounds.

5. In the method of claim 4, keeping the temperature below the temperature of pyrolysis.

6. In the method of claim 4, using $CBrCl_3$ as the bromo organic compound.

7. In the method of claim 4, reacting the polymeric product from the flashing operation with further chlorotrifluoroethylene while under the influence of heat and actinic rays to produce polymeric products of higher boiling point.

8. The method of producing an oxygen-free mixture of saturated bromopolyfluoro compounds which comprises reacting a fluoroethylene compound having at least two fluorine atoms on the same carbon atom with a saturated bromo organic compound of the group consisting of halogenated bromo methanes, halogenated bromo ethanes, and halogenated bromo propanes in a confining vessel with agitation and under the influence of actinic rays as result from a mercury arc lamp, and separating a more readily volatile portion from the reaction by heating leaving the saturated bromopolyfluoro compounds.

9. In the method of claim 8, using chlorotrifluoroethylene as the fluoroethylene compound and bromo trichloromethane as the bromo organic compound.

10. The oxygen-free mixture of compounds represented by the general formula $$Q((CF_2CFCl)_n)_xBr_x$$

in which Q is a halogenated, saturated, hydrocarbon radical, $x$ represents a valence of at least one, $n$ is a plural integer not greater than 30.

11. The oxygen-free mixture of compounds represented by the general formula $$R(CF_2CFCl)_nBr$$

in which R is a saturated hydrocarbon radical containing a halogen of the group consisting of bromine, chlorine and fluorine, and $n$ is a plural integer not greater than 30.

12. The oxygen-free mixture of saturated compounds represented by the formula $$R(CF_2CFCl)_nCl$$

in which R is a saturated hydrocarbon radical containing a halogen of the group consisting of bromine, chlorine and fluorine, and $n$ is a plural integer not greater than 30.

13. The method of producing an oxygen-free mixture of compounds represented by the general formula $$Q((CF_2CFCl)_n)_xBr_x$$

in which Q is a halogenated, saturated, aliphatic hydrocarbon radical, $n$ is a plural integer not greater than 30, $x$ represents a valance of at least one, which comprises reacting $QBr_x$ with $(CF_2CFCl)_n$ under the influence of actinic rays as result from a mercury arc lamp.

References Cited in the file of this patent

UNITED STATES PATENTS

| | | |
|---|---|---|
| 2,420,975 | Plump | May 20, 1947 |
| 2,468,208 | Kharasch | Apr. 26, 1949 |
| 2,562,547 | Hanford et al. | July 31, 1951 |
| 2,579,437 | Miller | Dec. 18, 1951 |
| 2,609,402 | Ladd | Sept. 2, 1952 |
| 2,636,907 | Miller | Apr. 28, 1953 |
| 2,636,908 | Dittman et al. | Apr. 28, 1953 |

OTHER REFERENCES

Henne et al.: J. Am. Chem. Soc., vol. 63, page 3477 (1941).

Henne et al.: Abstracts Amer. Chem. Soc. Meeting, Sept. 3–8, 1950, page 12L. (Complete article J. A. C. S., April 1951, pp. 1791–1792.)